(12) United States Patent
Zhang

(10) Patent No.: US 12,250,190 B2
(45) Date of Patent: Mar. 11, 2025

(54) SESSION MESSAGE DISPLAY METHOD, ELECTRONIC DEVICE AND STORAGE MEDIUM

(71) Applicant: BEIJING BYTEDANCE NETWORK TECHNOLOGY CO., LTD., Beijing (CN)

(72) Inventor: Xu Zhang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/880,340

(22) Filed: Aug. 3, 2022

(65) Prior Publication Data
US 2022/0377040 A1 Nov. 24, 2022

Related U.S. Application Data

(63) Continuation of application No. 17/727,354, filed on Apr. 22, 2022, now abandoned, which is a (Continued)

(30) Foreign Application Priority Data

Nov. 12, 2019 (CN) .......................... 201911102853.5

(51) Int. Cl.
H04L 51/23 (2022.01)
G06F 3/04817 (2022.01)
(Continued)

(52) U.S. Cl.
CPC .......... H04L 51/23 (2022.05); G06F 3/04817 (2013.01); G06F 3/0482 (2013.01); H04L 51/04 (2013.01)

(58) Field of Classification Search
CPC ..... H04L 51/23; H04L 51/04; G06F 3/04817; G06F 3/0482; G06F 3/04842;
(Continued)

(56) References Cited

U.S. PATENT DOCUMENTS 7,895,277 B2 * 2/2011 Drory ................... H04L 51/234
709/224
8,190,754 B2 * 5/2012 Strickland ............ H04N 21/441
725/27
(Continued)

FOREIGN PATENT DOCUMENTS

CN 104780093 A 7/2015
CN 104967550 A 10/2015
(Continued)

OTHER PUBLICATIONS

International Search Report and Written Opinion issued in International Patent Application No. PCT/CN2020/128163 on Feb. 10, 2021.
(Continued)

Primary Examiner — Raqiul A Choudhury
(74) Attorney, Agent, or Firm — Astute IP Law Group

(57) ABSTRACT

Provided are a session message display method, an electronic device and a storage medium. The session message display method includes the following, a first session message input by a first user for at least one second user is received on a session page, and the first session message is sent to an instant messaging application client of each second user of the at least one second user; a message display content is generated in the message entry of a session list page of the first user according to at least one of a reading action or a reply action of the at least one second user on the first session message; where the message display content includes the first session message and message state infor-
(Continued)

mation of the first session message, and the message entry is associated with the at least one second user.

12 Claims, 10 Drawing Sheets

Related U.S. Application Data continuation of application No. PCT/CN2020/128163, filed on Nov. 11, 2020.

(51) Int. Cl.
  *G06F 3/0482* (2013.01)
  *H04L 51/04* (2022.01)

(58) Field of Classification Search
  CPC .............. G06F 3/0488; G06F 3/04883; G06F 3/04847; G06F 3/0481; G06F 3/0484; G06F 3/04845
  See application file for complete search history.

(56) References Cited

U.S. PATENT DOCUMENTS

| | | | | |
|---|---|---|---|---|
| 9,277,015 | B1* | 3/2016 | Elyashiv | H04L 67/51 |
| 10,305,841 | B2* | 5/2019 | Chiu | H04L 51/224 |
| 2001/0003189 | A1* | 6/2001 | Miyazawa | H04L 67/75 |
| | | | | 709/206 |
| 2005/0156873 | A1* | 7/2005 | Walter | H04L 51/04 |
| | | | | 345/156 |
| 2006/0236266 | A1* | 10/2006 | Majava | G06F 3/0481 |
| | | | | 715/810 |
| 2006/0248150 | A1* | 11/2006 | Chaar | G06F 3/0482 |
| | | | | 709/206 |
| 2008/0028026 | A1* | 1/2008 | Chen | G06Q 10/107 |
| | | | | 709/206 |
| 2008/0153459 | A1* | 6/2008 | Kansal | H04L 51/56 |
| | | | | 455/412.1 |
| 2009/0307612 | A1* | 12/2009 | Singh | G06Q 10/10 |
| | | | | 709/204 |
| 2010/0011064 | A1* | 1/2010 | Mabry | G06Q 10/107 |
| | | | | 709/206 |
| 2011/0145744 | A1 | 6/2011 | Haynes et al. | |
| 2011/0231499 | A1* | 9/2011 | Stovicek | H04L 51/42 |
| | | | | 709/206 |
| 2013/0097526 | A1 | 4/2013 | Stovicek et al. | |
| 2013/0222627 | A1* | 8/2013 | Earnshaw | H04N 23/661 |
| | | | | 348/E5.042 |
| 2014/0096033 | A1* | 4/2014 | Blair | H04L 51/56 |
| | | | | 715/752 |
| 2014/0304613 | A1 | 10/2014 | Coe | |
| 2016/0050157 | A1* | 2/2016 | Abbott | H04L 47/365 |
| | | | | 709/223 |
| 2016/0080689 | A1* | 3/2016 | Pycock | H04L 51/10 |
| | | | | 348/14.07 |
| 2017/0041272 | A1* | 2/2017 | Chang | H04L 51/063 |
| 2017/0094078 | A1* | 3/2017 | Ohara | H04N 1/00042 |
| 2017/0201476 | A1* | 7/2017 | Zou | H04L 67/01 |
| 2018/0024991 | A1* | 1/2018 | Baldwin | G06F 16/335 |
| | | | | 704/9 |
| 2018/0059885 | A1* | 3/2018 | Gonnen | G06F 3/04886 |
| 2018/0081529 | A1* | 3/2018 | Zhang | G06F 3/0482 |
| 2018/0095940 | A1* | 4/2018 | Meixner | H04L 51/046 |
| 2018/0097902 | A1* | 4/2018 | Meixner | G06F 3/0481 |
| 2018/0331996 | A1* | 11/2018 | Zhang | H04L 51/04 |
| 2018/0373683 | A1* | 12/2018 | Hullette | H04L 51/04 |
| 2019/0180396 | A1* | 6/2019 | Shirasaka | G06F 3/0482 |
| 2019/0386937 | A1* | 12/2019 | Kim | G06F 40/268 |
| 2021/0314284 | A1* | 10/2021 | Zhai | G06F 3/0484 |
| 2022/0150195 | A1 | 5/2022 | Chaudhri et al. | |

FOREIGN PATENT DOCUMENTS

| | | | | |
|---|---|---|---|---|
| CN | 105119799 | A | 12/2015 | |
| CN | 105515957 | A | 4/2016 | |
| CN | 105553834 | A | 5/2016 | |
| CN | 106100972 | A | 11/2016 | |
| CN | 106775262 | A | 5/2017 | |
| CN | 107566255 | A | 1/2018 | |
| CN | 108173738 | A * | 6/2018 | ............ H04L 51/04 |
| CN | 109561198 | A | 4/2019 | |
| CN | 109725975 | A | 5/2019 | |
| CN | 109842541 | A | 6/2019 | |
| CN | 109871165 | A | 6/2019 | |
| CN | 110134484 | A | 8/2019 | |
| CN | 110191231 | A | 8/2019 | |
| CN | 110851035 | A | 2/2020 | |
| CN | 109871165 | B | 3/2022 | |
| JP | 2018032329 | A | 3/2018 | |
| JP | 2019514083 | A | 5/2019 | |

OTHER PUBLICATIONS

Extended European Search Report in EP20888387.6, mailed Nov. 4, 2022, 10 pages.
Office Action in CN202110679052.6, mailed on Jan. 13, 2023, 9 pages.
Office Action in JP2022522328, mailed May 23, 2023, 3 pages.
Office Action and Search Report in CN202110679052.6, dated Aug. 23, 2023, 7 pages.
Teaching Assistant, "How to save WeChat chat records?" pc6, Oct. 18, 2018, Retrieved from the Internet <URL:https://www.pc6.com/video/4610.html>, 2 pages.
Reexamination Decision for Chinese Patent Application No. 202110679052.6, mailed on Oct. 29, 2024, 22 pages.

* cited by examiner

SESSION MESSAGE DISPLAY METHOD, ELECTRONIC DEVICE AND STORAGE MEDIUM

CROSS-REFERENCE TO RELATED APPLICATIONS

This application is a continuation of U.S. patent application Ser. No. 17/727,354, filed on Apr. 22, 2022, which is a continuation of International Patent Application No. PCT/CN2020/128163, filed on Nov. 11, 2020, which is based on and claims priority to Chinese Patent Application No. 201911102853.5, filed with the China National Intellectual Property Administration (CNIPA) on Nov. 12, 2019, the disclosures of which are incorporated herein by reference in their entireties.

TECHNICAL FIELD

The present application relates to the field of instant messaging technologies, for example, a session message display method, an electronic device and a storage medium.

BACKGROUND

Instant messaging is a popular manner of communication, and various instant messaging application programs emerge in endlessly. For an instant messaging client, it is generally designed in a tertiary model of session list-session-message, where the message is the content of information, the session is a collection of messages, the session list is a centralized location of sessions, and all sessions in the session list are arranged according to the generation time of the latest message of the corresponding session in a reverse chronological order.

In the instant messaging client, all message sessions are displayed in the session list. After a user A sends a message M to a user B by using the session, if the user B does not immediately read and respond to the message M, the user A temporarily leaves the session and processes a message of other sessions in the session list. At this time, if the user A wants to know whether the message M is read or whether there is a responded emoji message, the user A needs to enter the session of the user A and the user B again for checking. If the message M is not read or there is no responded emoji message, the user A needs to leave the session of the user A and the user B, and then repeatedly enters and exits the session for checking. The operation of repeatedly entering and exiting the session for checking takes time, consumes attention, and affects the working efficiency.

SUMMARY

The present disclosure provides a session message display method and apparatus, an electronic device and a storage medium to optimize the session message display scheme, reduce duplicative and inefficient operations that a user needs to repeatedly enter and exit a session for checking in order to obtain the communication progress of the session, and improve the processing efficiency of a session message.

A session message display method is provided. The session message display method includes steps described below, a first session message input by a first user for one or more second users is received on a session page, and the first session message is sent to an instant messaging application client of each of the one or more second users; and a message display content is generated in a message entry of the session list page of the first user according to one of a reading action or a reading action and a reply action of the one or more second users on the first session message; where the message display content includes the first session message and message state information of the first session message, and the message entry is associated with the one or more second users.

A session message display apparatus is further provided. The session message display apparatus includes a message sending module and a first content generation module. The message sending module is configured to receive a first session message input by a first user for one or more second users on a session page and send the first session message to an instant messaging application client of each of the one or more second users. The first content generation module is configured to generate a message display content in the message entry of a session list page of the first user according to one of a reading action or a reading action and a reply action of the one or more second users on the first session message. The message display content includes the first session message and message state information of the first session message, and the message entry is associated with the one or more second users.

An electronic device is further provided. The electronic device includes one or more processors and a storage apparatus. The storage apparatus is configured to store one or more programs. The one or more programs, when executed by the one or more processors, cause the one or more processors to implement the session message display method described above.

A computer-readable storage medium is further provided. The computer-readable storage medium stores a computer program, and the computer program, when executed by a processor, implements the session message display method described above.

DETAILED DESCRIPTION

Embodiments of the present disclosure will be described below with reference to the accompanying drawings. Although some embodiments of the present disclosure are shown in the accompanying drawings, the present disclosure may be embodied in many forms and should not be construed as limited to the embodiments set forth herein.

The various steps recited in method implementations of the present disclosure may be performed in different orders, and/or in parallel. In addition, the method implementations may include additional steps and/or omit performing the shown steps. The scope of the present disclosure is not limited in this respect.

As used herein, the term "include" and its variants are open-ended, that is, "including but not limited to". The term "based on" is "at least partially based on". The term "one embodiment" means "at least one embodiment"; the term "another embodiment" means "at least one further embodiment"; and the term "some embodiments" means "at least some embodiments". Related definitions for other terms will be given in the following description.

The concepts of "first", "second", and the like mentioned in the present disclosure are only used for distinguishing different apparatuses, modules, or units, and are not used for limiting the order or interdependence of functions performed by these apparatuses, modules, or units.

The modification of "one" or "multiple" mentioned in the present disclosure is intended to be schematic rather than limitation, and should be understood as "one or more" unless the context clearly indicates otherwise.

The names of messages or information interacted among multiple apparatuses in the implementations of the present disclosure are for illustrative purposes only and are not intended to limit the scope of such messages or information.

Figure 1:
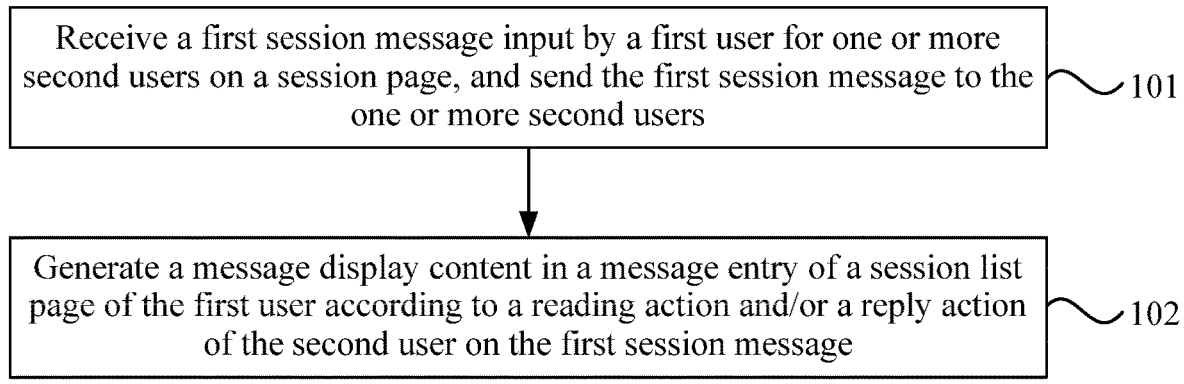
FIG. 1 is a flowchart of a session message display method provided in an embodiment of the present disclosure.

FIG. 1 is a flowchart of a session message display method provided in an embodiment of the present disclosure. The embodiment of the present disclosure is applicable to the case of determining a message display content in a message entry in a session list page according to a session message in a session, the method may be executed by a session message display apparatus, and the apparatus may be implemented by adopting software and/or hardware. The apparatus may be configured in an instant messaging application client mounted in an electronic device. As shown in FIG. 1, the method may include steps described below.

In step 101, a first session message input by a first user for one or more second users is received on a session page, and the first session message is sent to the one or more second users.

The session is generally divided into a single-chat session and a group-chat session. A single chat refers to a session in which there are only 2 participants in the session. A group chat refers to a session in which there may be 2 or more participants.

The session message has an unread state and a read state. When the session message is sent to the session, if other session participants except a sender do not read the message, the session message is in the unread state, and if all other session participants read the message except the sender, then the session message is in the read state.

The session message is divided into an independent message and a response message. The independent message refers to a session message containing main elements such as a sender, a message content, a session to which the message is sent, and sending time. The response message refers to a session message containing main elements such as a sender, a message content, a session to which this message is sent, sending time, and a response target message. The response message includes a response content message and a response emoji message. The response content message may take any form of character, picture, file or the like as the body of a response. The response emoji message may only take one emoji symbol as the body of the response.

In a specific instance, the session is the single-chat session. Session participants of the session are a first user and one second user. A first session message input by the first user for the one second user is received on a session page, and the first session message is sent to the second user. In an embodiment, an instant messaging application client of the first user acquires the first session message input by the first user for the single-chat session, and sends the first session message to an instant messaging application client of the one second user. The first session message may contain main elements such as the sender, the message content, the session to which this message is sent, and the sending time. The sender of the first session message is the first user.

In another specific instance, the session is the group-chat session. Session participants of the session are a first user and multiple second users. A first session message input by the first user for the multiple second users is received on a session page, and the first session message is sent to the multiple second users. In an embodiment, an instant messaging application client of the first user acquires the first session message input by the first user for the group-chat session, and sends the first session message to instant messaging application clients of the multiple second users.

In step 102, a message display content is generated in a message entry of a session list page of the first user according to a reading action and/or a reply action of the one or more second users on the first session message.

The message display content includes the first session message and message state information of the first session message, and the message entry is associated with the second user.

In an embodiment, the message state information includes a read state and an emoji response for the first session message.

For each session, when a session message of the session exists, important information of the session message may be displayed through the message display content in a message entry of the session in the session list. Therefore, the user may know the important information of the session message only on the session list page without entering the session. Previously, the user needs to repeatedly enter the session for checking so as to learn information in time, and now the user does not need manual operations and only needs to keep the session list page open to directly know messages within the session.

In an embodiment, that the message display content is generated in the message entry of the session list page of the first user according to the reading action and/or the reply action of the second user on the first session message may include that: before the second user reads the first session message, the message display content is generated in the message entry of the session list page of the first user, and the message display content includes an unread identifier and the first session message.

Thus, the first user may determine that, only in the message entry associated with the second user of the session list page, the second user has received the first session message and does not read the first session message without entering the session.

In an embodiment, that the message display content is generated in the message entry of the session list page of the first user according to the reading action and/or the reply action of the second user on the first session message may include that: after the second user reads the first session message, the message display content is updated, and the unread identifier is updated into a read identifier.

Thus, the first user may determine that, only in the message entry associated with the second user of the session list page, the second user has read the first session message without entering the session.

In an embodiment, that the message display content is generated in the message entry of the session list page of the first user according to the reading action and/or the reply action of the second user on the first session message may include that: when an emoji response of the second user to the first session message is received, the message display content is updated, and the read identifier is replaced with an emoji icon replied by the second user.

Thus, the first user may determine, only in the message entry associated with the second user of the session list page, whether the second user replies the emoji icon without entering the session.

According to the technical scheme provided in the embodiments of the present disclosure, the message display content is generated in the message entry of the session list page of the first user according to the reading action and/or the reply action of the second user on the first session message, the message display content includes the first session message and the message state information, and the message entry is associated with the second user, so that the message state information of the session message may be intuitively provided through the message display content in the message entry of the session list page, duplicative and inefficient operations that the user needs to repeatedly enter and exit the session for checking a message state in order to obtain the communication progress of the session are avoided, and the processing efficiency of the session message is improved.

Figure 2A:
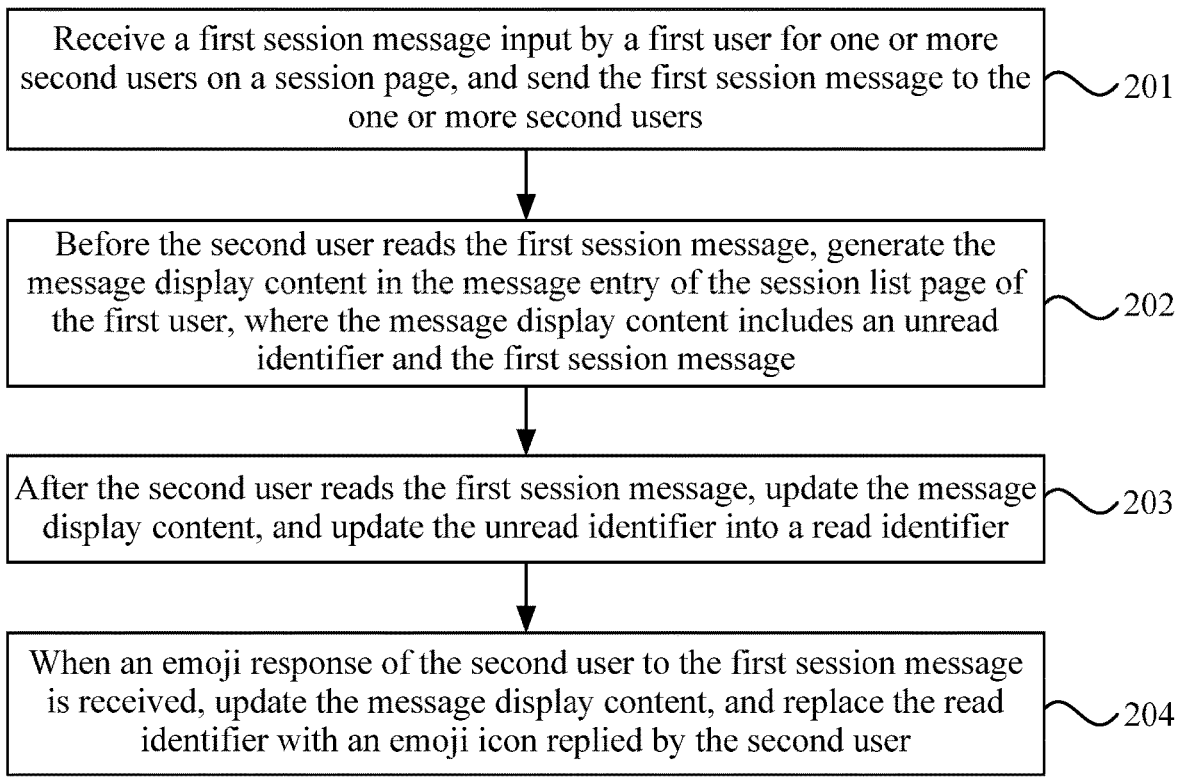
FIG. 2A is a flowchart of another session message display method provided in an embodiment of the present disclosure.

FIG. 2A is a flowchart of another session message display method provided in an embodiment of the present disclosure. An embodiment of the present disclosure may be combined with alternative schemes in one or more embodiments described above. In the embodiments of the present disclosure, that the message display content is generated in the message entry of the session list page of the first user according to the reading action and/or the reply action of the second user on the first session message may include that: before the second user reads the first session message, the message display content is generated in the message entry of the session list page of the first user, where the message display content includes an unread identifier and the first session message.

That the message display content is generated in the message entry of the session list page of the first user according to the reading action and/or the reply action of the second user on the first session message may include that: after the second user reads the first session message, the message display content is updated, and the unread identifier is updated into a read identifier.

That the message display content is generated in the message entry of the session list page of the first user according to the reading action and/or the reply action of the second user on the first session message may include that: when an emoji response of the second user to the first session message is received, the message display content is updated, and a read identifier is replaced with an emoji icon replied by the second user.

As shown in FIG. 2A, the method may include steps described below.

In step 201, a first session message input by a first user for one or more second users is received on a session page, and the first session message is sent to the one or more second users.

Figure 2B:
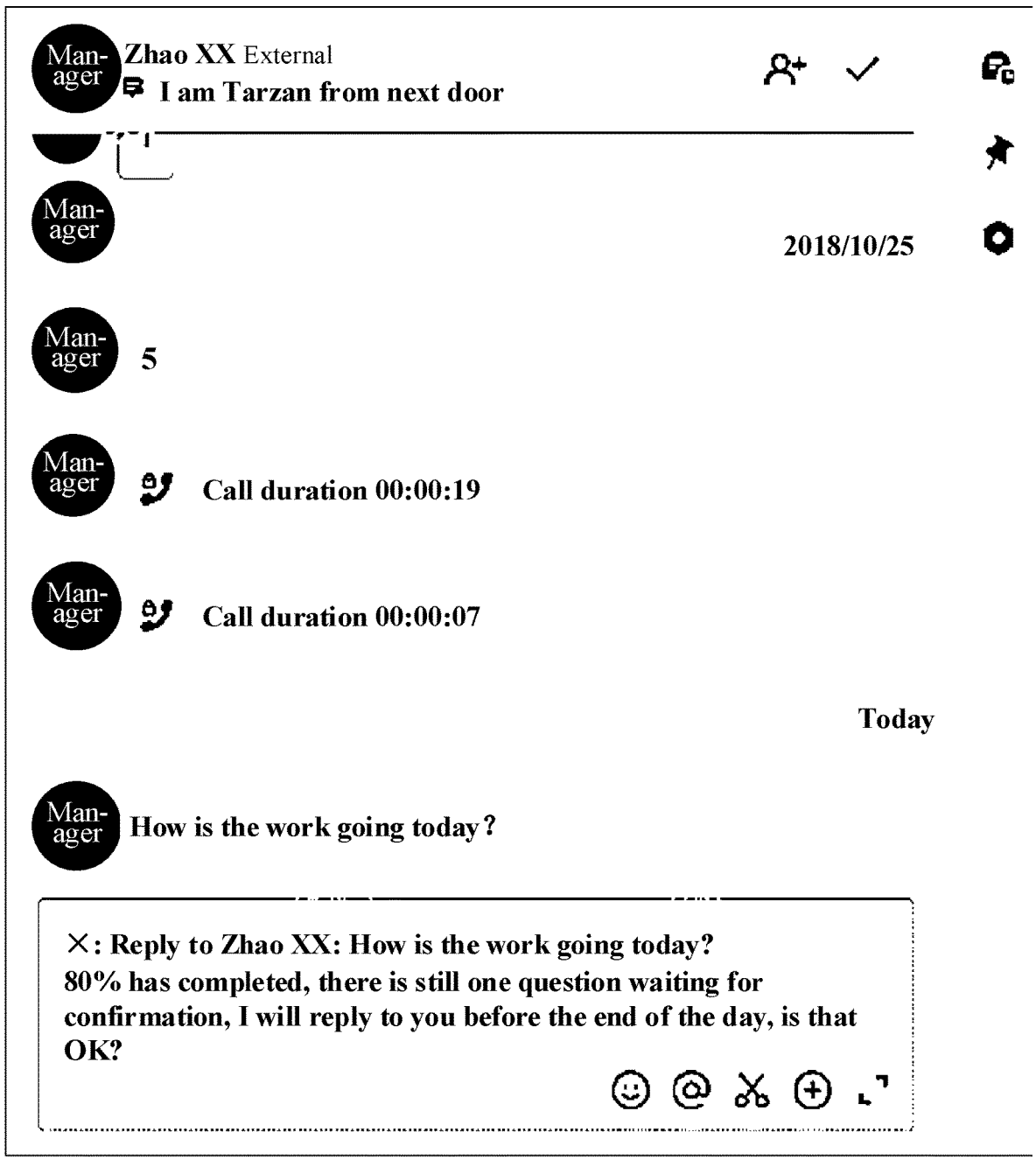
FIG. 2B is a schematic diagram of a session page provided in an embodiment of the present disclosure.

Exemplarily, FIG. 2B is a schematic diagram of a session page provided in an embodiment of the present disclosure. The session is a single-chat session. Session participants of the session are the first user and one second user. As shown in FIG. 2B, the first user enters the session, and inputs a first session message that "80% has completed, and there is still one question waiting for confirmation, I will reply to you before the end of the day, is that OK?" in the session.

Figure 2C:
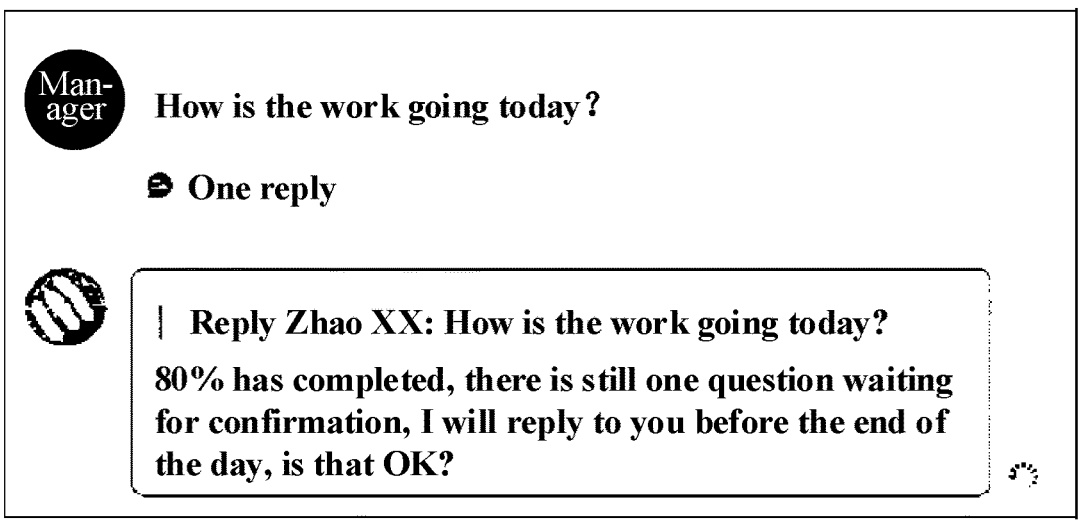
FIG. 2C is a schematic diagram of another session page provided in an embodiment of the present disclosure.

FIG. 2C is a schematic diagram of another session page provided in an embodiment of the present disclosure. An instant messaging application client of the first user acquires a first session message input by the first user for the session, and sends the first session message to an instant messaging application client of one second user "Zhao XX". As shown in FIG. 2C, the first session message that "80% has completed, and there is still one question waiting for confirmation, I will reply to you before the end of the day, is that OK?" is in the in-sending state.

Figure 2D:
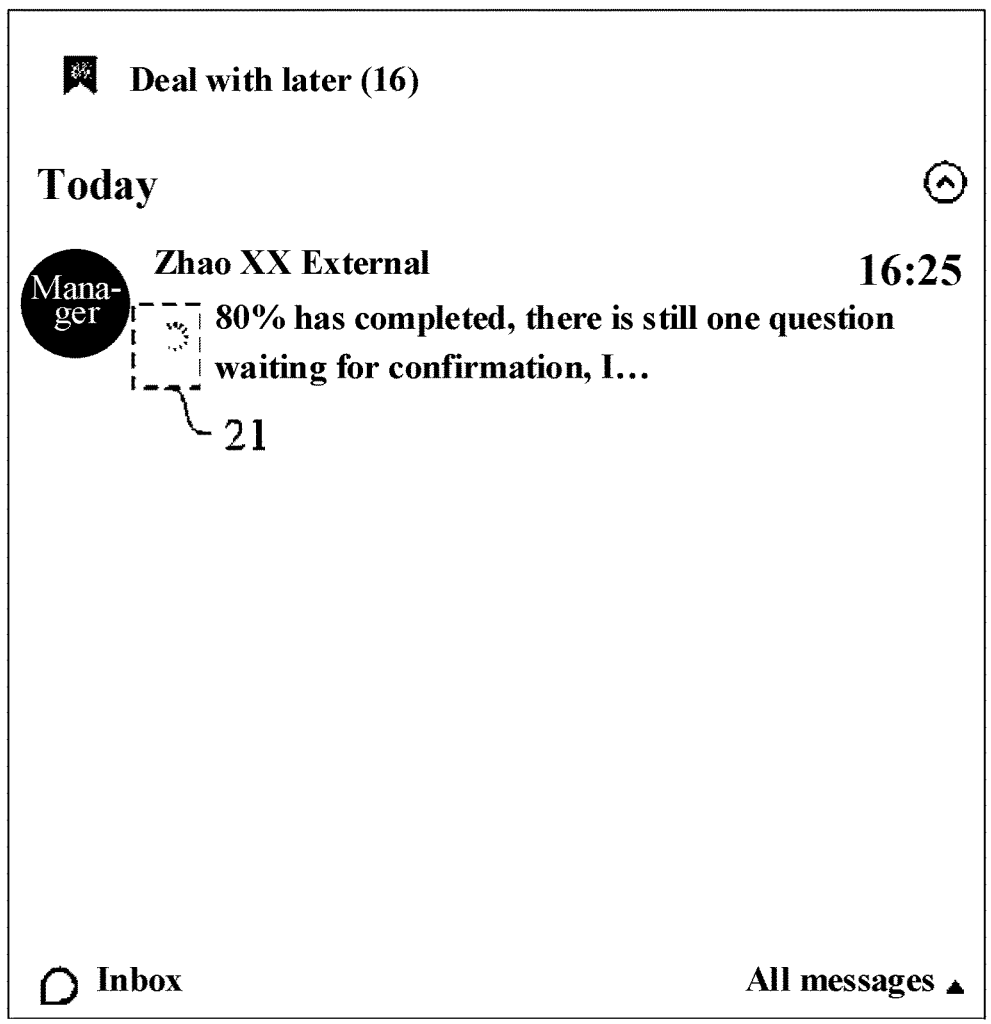
FIG. 2D is a schematic diagram of a session list page provided in an embodiment of the present disclosure.

FIG. 2D is a schematic diagram of a session list page provided in an embodiment of the present disclosure. As shown in FIG. 2D, in the message entry associated with the second user "Zhao XX" of the session list page, the in-sending identifier 21 is displayed before the first session message, which represents that the first session message "80% has completed, and there is still one question waiting for confirmation, I will reply to you before the end of the day, is that OK?" is being sent.

In step 202, before the second user reads the first session message, the message display content is generated in the message entry of the session list page of the first user, and the message display content includes an unread identifier and the first session message.

Before the second user reads the first session message, the message display content includes the unread identifier and the first session message.

Figure 2E:
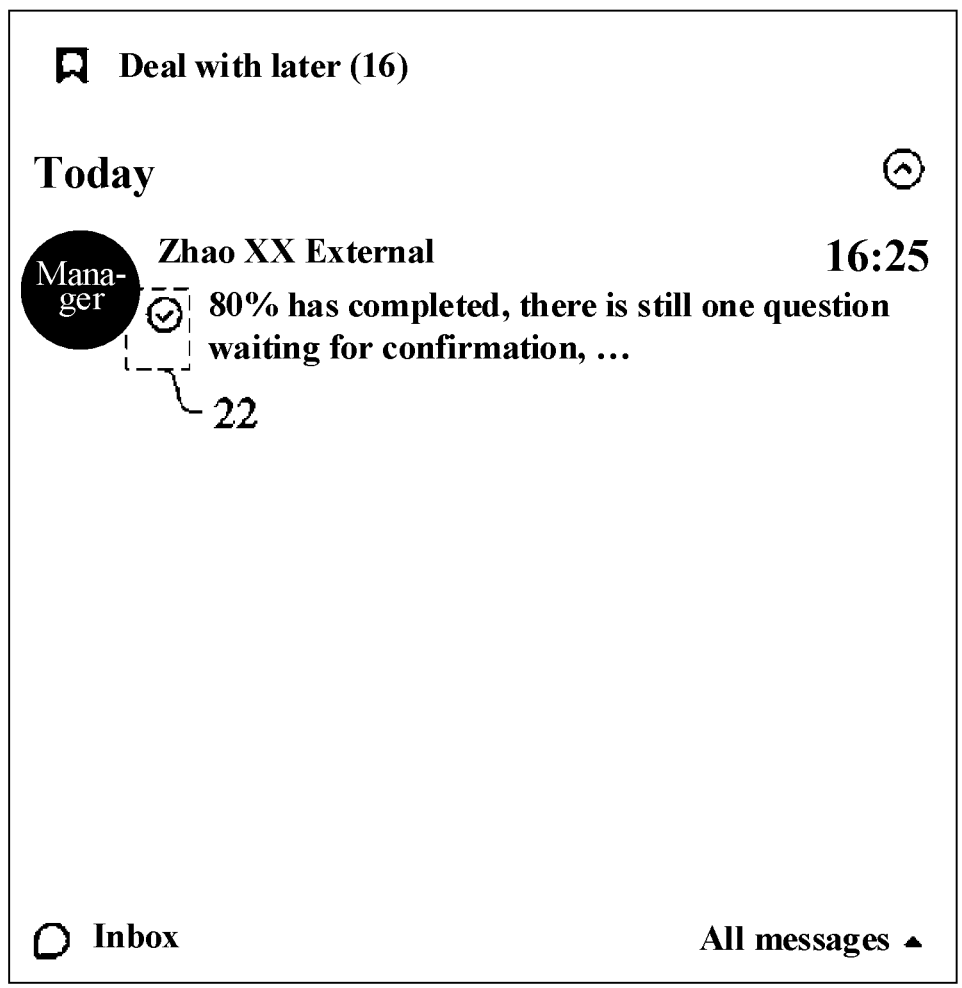
FIG. 2E is a schematic diagram of another session list page provided in an embodiment of the present disclosure.

Exemplarily, as shown in FIG. 2E, in the message entry associated with the second user "Zhao XX" of the session list page, the unread identifier 22 is displayed before the first session message, which represents that the first session message "80% has completed, and there is still one question waiting for confirmation, I will reply to you before the end of the work, is that OK?" is sent successfully, and the second user "Zhao XX" has received the first session message and does not read the first session message.

In step 203, after the second user reads the first session message, the message display content is updated, and the unread identifier is updated into a read identifier.

In an embodiment, updating the unread identifier into the read identifier may include that the color and/or the brightness of the unread identifier is changed to generate the read identifier.

Figure 2F:
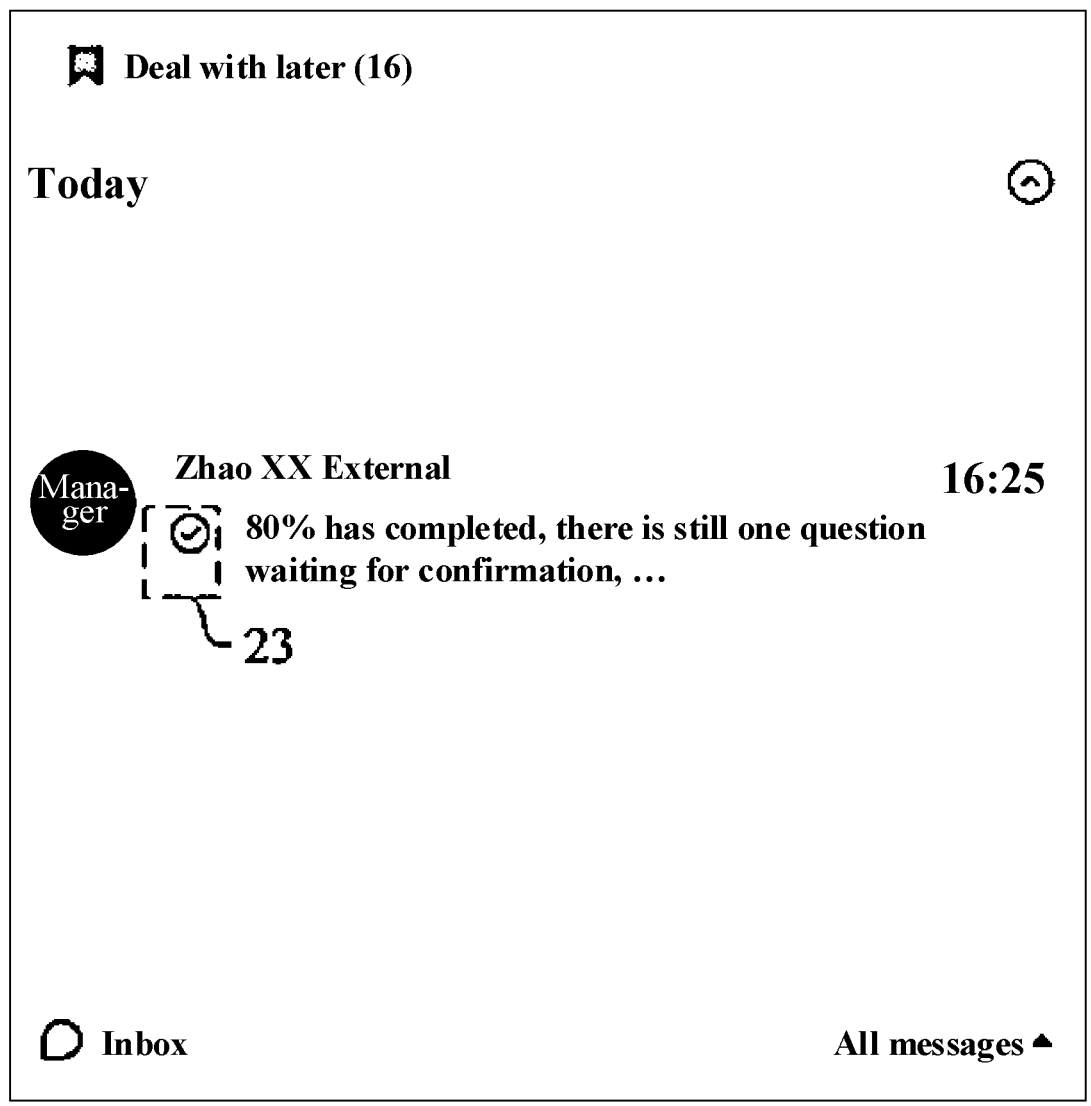
FIG. 2F is a schematic diagram of another session list page provided in an embodiment of the present disclosure.

Exemplarily, as shown in FIG. 2F, in the message entry associated with the second user "Zhao XX" of the session list page, the read identifier 23 is displayed before the first session message, which represents that the first session message "80% has completed, and there is still one question waiting for confirmation, I will reply to you before the end of the day, is that OK?" is sent successfully, the second user "Zhao XX" has read the first session message. The read identifier 23 in FIG. 2F is generated by changing the color and/or the brightness of the unread identifier 22 in FIG. 2E.

In step 204, when an emoji response of the second user to the first session message is received, the message display content is updated, and the read identifier is replaced with an emoji icon replied by the second user.

The second user feeds back session information containing the emoji icon for the first session message. The emoji icon may be any graphic and is used for quickly expressing the attitude and feedback of the second user on the first session message.

When the emoji response of the second user to the first session message is received, the message display content includes the first session message and the emoji icon replied by the second user.

In an embodiment, when the emoji response of the second user to the first session message is received, that the message display content is updated and the read identifier is replaced with the emoji icon replied by the second user may further include that: a separation identifier is added between the emoji icon and the first session message.

Figure 2G:
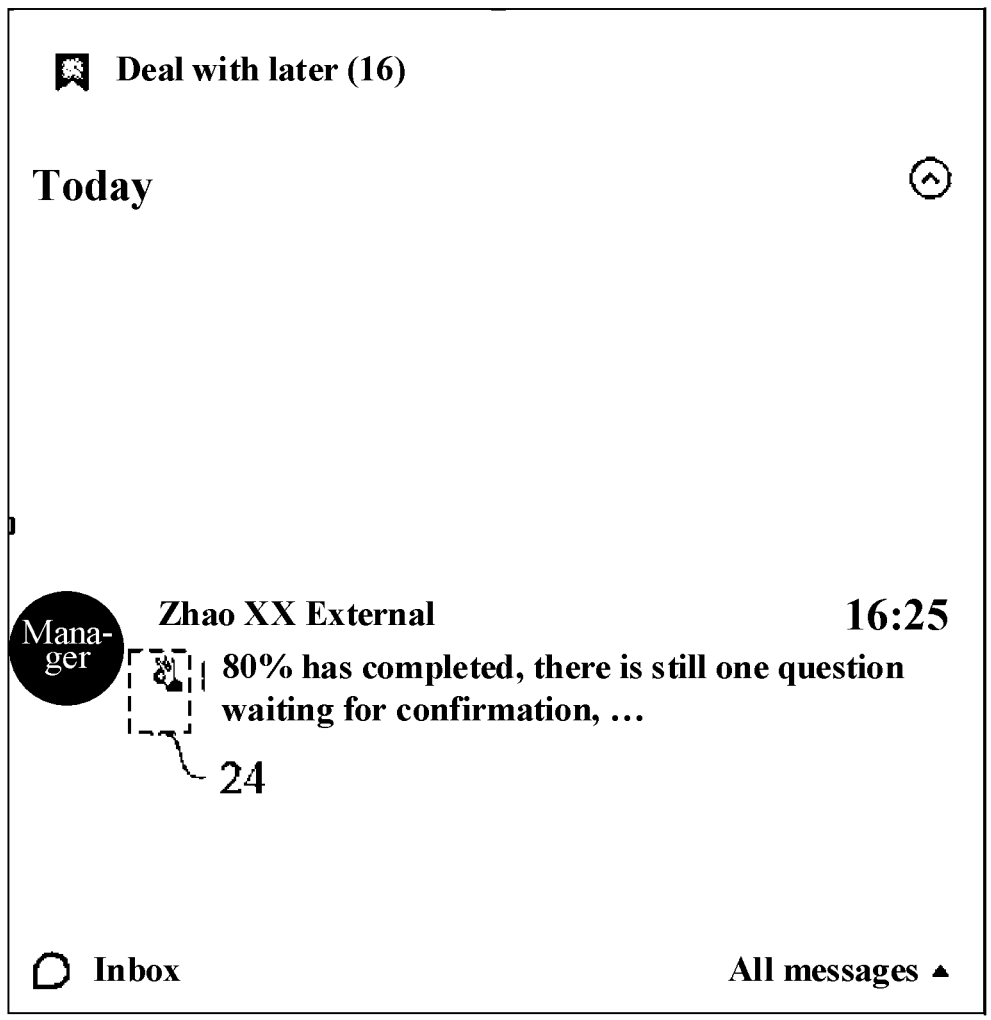
FIG. 2G is a schematic diagram of another session list page provided in an embodiment of the present disclosure.

Exemplarily, as shown in FIG. 2G, in the message entry associated with the second user "Zhao XX" of the session list page, the emoji icon 24 replied by the second user "Zhao XX" is displayed before the first session message, the separation identifier "|" is provided between the emoji icon 24 and the first session message that "80% has completed, and there is still one question waiting for confirmation, I will reply to you before the end of the day, is that OK?", which represents that the first session message that "80% has completed, and there is still one question waiting for confirmation, I will reply to you before the end of the day, is that OK?" is sent successfully, and the second user "Zhao XX" has read the first session message and replies the emoji icon 24.

In the session list page of the embodiments of the present disclosure, information that is important for the communication progress within the session is refined, and the information is reorganized in a limited space and displayed to the user. According to the embodiments of the present disclosure, the simplest page elements are adopted, in the message entry associated with the second user of the session list page, various message state information is provided to the maximum extent, so that the disorder of page layout is avoided, and meanwhile, the waste of time for the user to repeatedly enter the session is avoided, the user may intuitively know the state of the session message, and a plan for further communication is facilitated. If the user performs multiple single-chat-session communications with multiple persons at the same time, the effect of efficiency improvement is more obvious. Communication work, which may only be performed in series previously, may now be performed in parallel.

Common instant messaging tools cannot directly check whether session information containing the emoji icon is fed back in the session list, and cannot directly check the emoji icon in the session list. The user still needs to enter the session for checking the emoji icon.

According to the technical scheme provided in the embodiments of the present disclosure, before the second user reads the first session message, the message display content is generated in the message entry of the session list page of the first user, where the message display content includes the unread identifier and the first session message; after the second user reads the first session message, the message display content is updated, and the unread identifier is updated into the read identifier; when the emoji response of the second user to the first session message is received, the message display content is updated, and the read identifier is replaced with the emoji icon replied by the second user, so that various message state information may be provided in the message entry associated with the second user of the session list page, therefore, the user may directly know information within the session only by keeping the session list page open, and the emoji icon replied by the second user may be displayed in the message entry associated with the second user of the session list page, duplicative and ineffective operations that the user needs to repeatedly enter and exit the session for checking whether the opposite side feeds back the emoji icon are avoided, and thus the processing efficiency of the session message is improved.

Figure 3A:
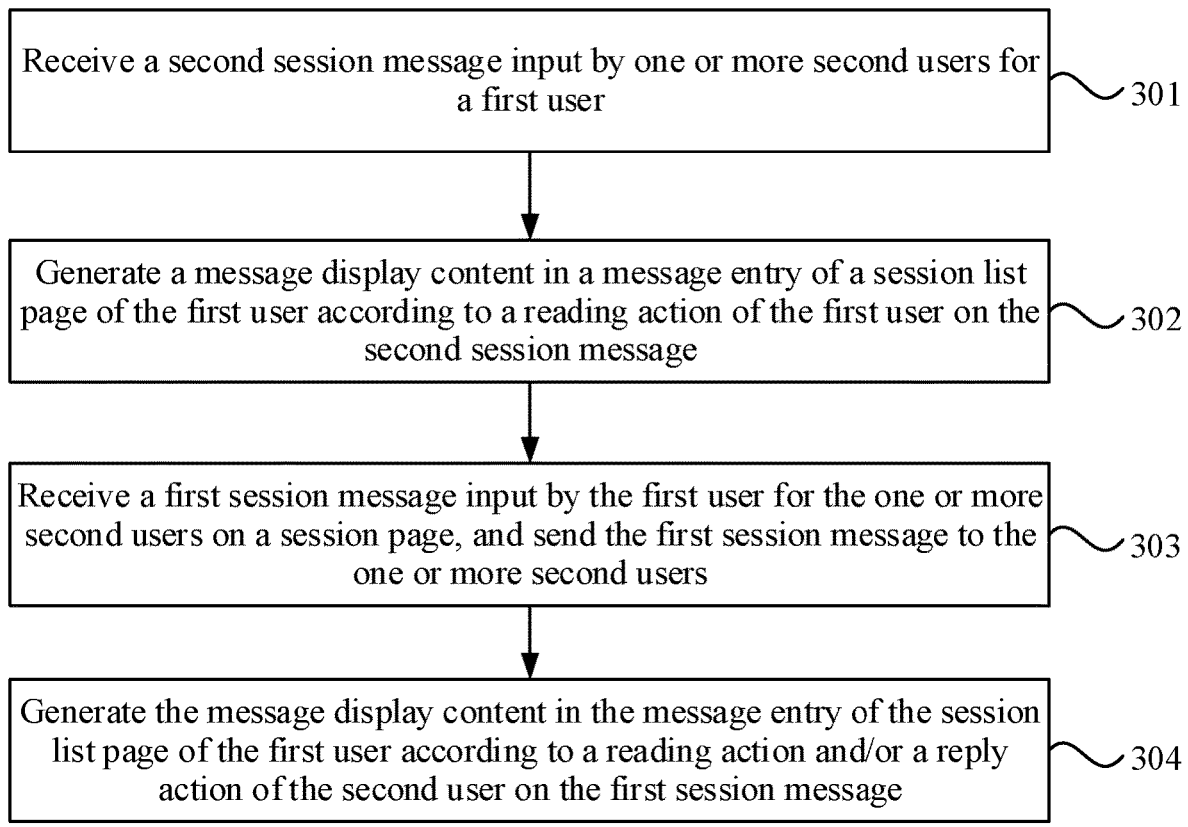
FIG. 3A is a flowchart of another session message display method provided in an embodiment of the present disclosure.

FIG. 3A is a flowchart of another session message display method provided in an embodiment of the present disclosure. An embodiment of the present disclosure may be combined with alternative schemes in one or more embodiments described above. In the embodiments of the present disclosure, before a first session message input by a first user for one or more second users is received, the method may further include that: a second session message input by one or more second users for the first user is received; and the message display content is generated in the message entry of the session list page of the first user according to the reading action of the first user on the second session message, where the message display content includes the second session message and message state information of the second session message, and the message entry is associated with the second user.

As shown in FIG. 3A, the method may include steps described below.

In step 301, a second session message input by one or more second users for a first user is received.

In an embodiment, the instant messaging application client of the first user receives the second session message input by the one or more second users for the first user.

In step 302, the message display content is generated in the message entry of the session list page of the first user according to a reading action of the first user on the second session message.

The message display content includes the second session message and message state information of the second session message, and the message entry is associated with the second user.

In an embodiment, that the message display content is generated in the message entry of the session list page of the first user according to the reading action of the first user on the second session message may include that: before the first user reads the second session message, the message display content is generated in the message entry of the session list page of the first user, where the message display content includes a received unread identifier and the second session message.

Thus, without entering the session, the first user may determine that, only in the message entry associated with the second user of the session list page, the second session message sent by the second user is received and the second session message is not read.

Figure 3B:
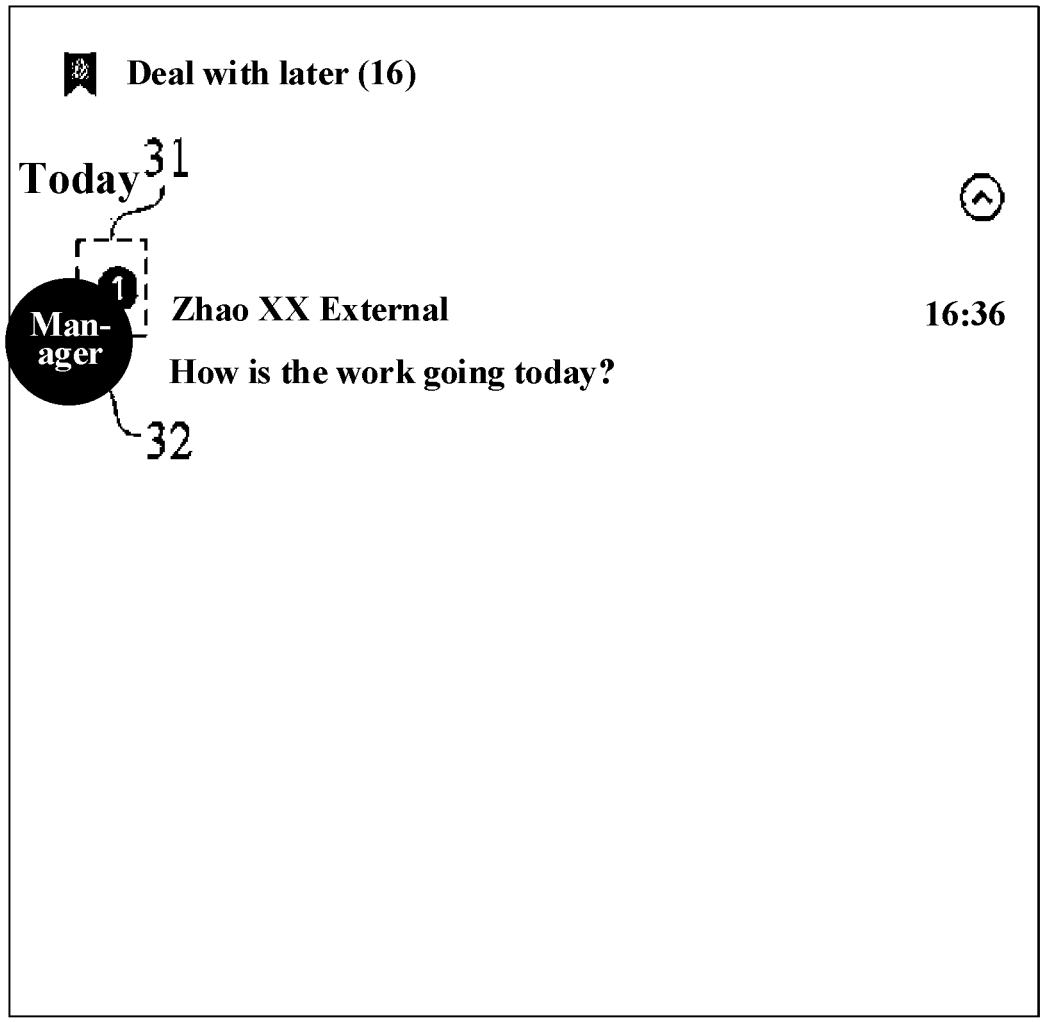
FIG. 3B is a schematic diagram of another session list page provided in an embodiment of the present disclosure.

Exemplarily, FIG. 3B is a schematic diagram of another session list page provided in an embodiment of the present disclosure. A second session message of "how is the work going today?" input for a session by the second user "Zhao XX" is received. As shown in FIG. 3B, in the message entry associated with the second user "Zhao XX" of the session list page, the received unread identifier 31 is displayed on the session identifier 32 in the message entry associated with the second user "Zhao XX" of the session list page.

In an embodiment, that the message display content is generated in the message entry of the session list page of the first user according to the reading action of the first user on the second session message may include that: after the first user reads the second session message, the message display content is updated, and the received unread identifier is updated into a read identifier.

In an embodiment, that the received unread identifier is updated into the received read identifier includes deleting the received unread identifier.

Thus, without entering the session, the first user may determine that, only in the message entry associated with the second user of the session list page, the second session message sent by the second user has been read.

Figure 3C:
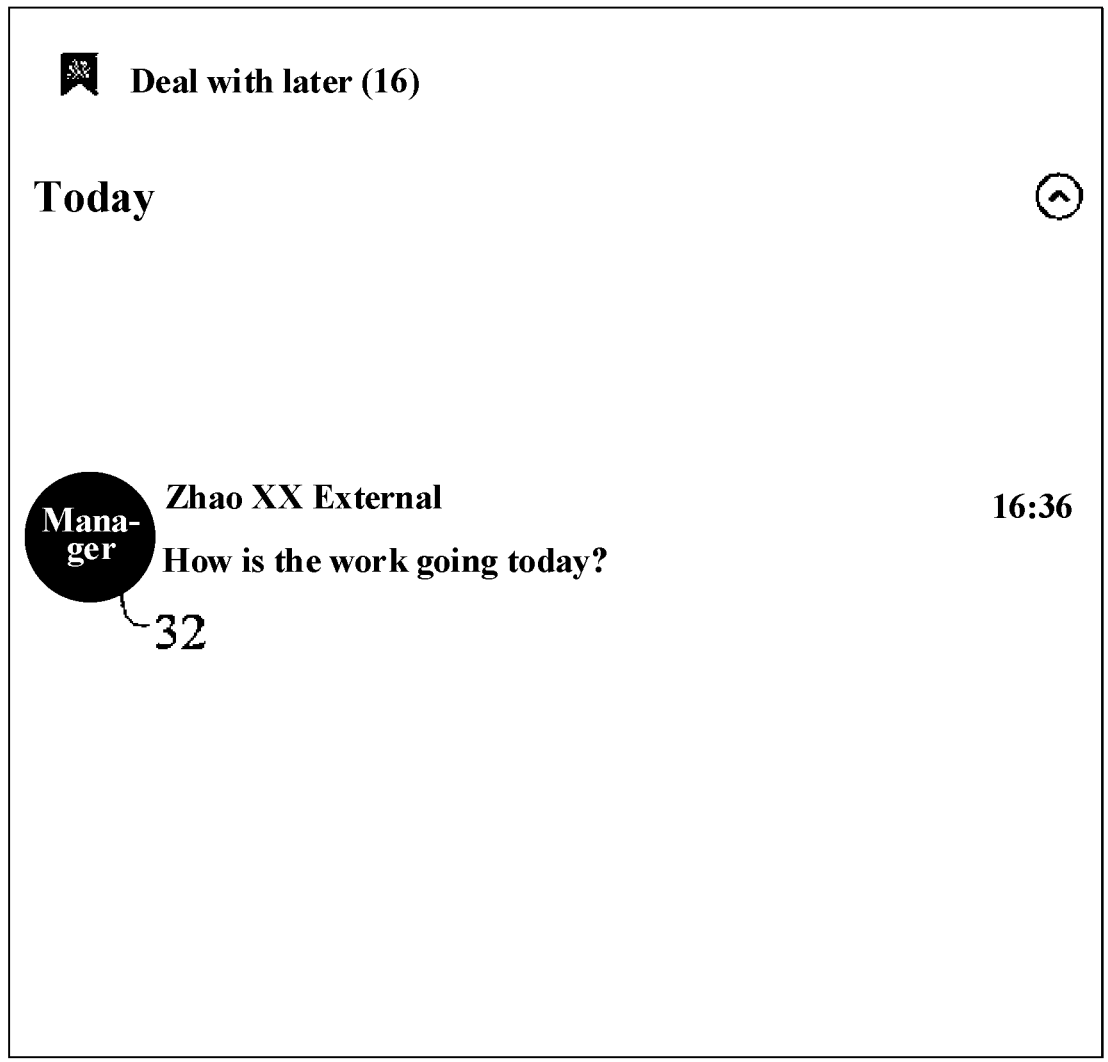
FIG. 3C is a schematic diagram of another session list page provided in an embodiment of the present disclosure.

Exemplarily, FIG. 3C is a schematic diagram of another session list page provided in an embodiment of the present disclosure. As shown in FIG. 3C, the unread identifier 31 is not displayed on the session identifier 32 in the message entry associated with the second user "Zhao XX" of the session list page, which represents that the first user has read the second session message "how is the work going today?".

In step 303, a first session message input by the first user for the one or more second users is received on the session page, and the first session message is sent to the one or more second users.

In step 304, the message display content is generated in the message entry of the session list page of the first user according to a reading action and/or a reply action of the second user on the first session message.

The message display content includes the first session message and message state information of the first session message, and the message entry is associated with the second user.

According to the technical scheme provided in the embodiments of the present disclosure, the second session message input by the one or more second users for the first user is received, and then the message display content is generated in the message entry of the session list page of the first user according to the reading action of the first user on the second session message; where the message display content includes the second session message and the message state information, and the message entry is associated with the second user, so that the message state information of the session message may be intuitively provided through the message display content in the message entry associated with the second user of the session list page, duplicative and inefficient operations that the user needs to repeatedly enter and exit the session for checking the message state in order to obtain the communication progress of the session are avoided, and the processing efficiency of the session message is improved.

Figure 4:
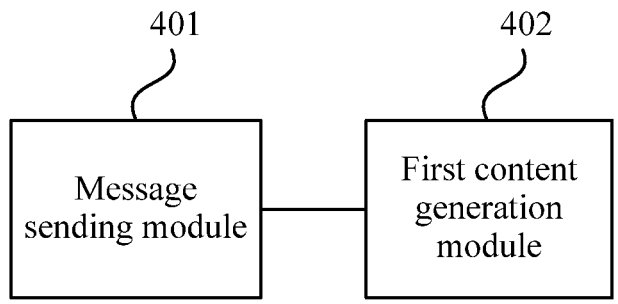
FIG. 4 is a schematic structural diagram of a session message display apparatus provided in an embodiment of the present disclosure.

FIG. 4 is a schematic structural diagram of a session message display apparatus provided in an embodiment of the present disclosure. The embodiments of the present disclosure may be suitable for the case of determining a message display content in a message entry on a session list page according to a session message in a session. This apparatus may be implemented in the software and/or hardware manner, and may be configured in an instant messaging application client mounted in an electronic device. As shown in FIG. 4, the apparatus may include a message sending module 401 and a first content generation module 402.

The message sending module 401 is configured to receive a first session message input by a first user for one or more second users on a session page, and send the first session message to the one or more second users. The first content generation module 402 is configured to generate a message display content in a message entry of the session list page of the first user according to a reading action and/or a reply action of the one or more second users on the first session message. The message display content includes the first session message and message state information of the first session message, and the message entry is associated with the one or more second users.

According to the technical scheme provided in the embodiments of the present disclosure, the message display content is generated in the message entry of the session list page of the first user according to the reading action and/or the reply action of the second user on the first session message, and the message display content includes the first session message and the message state information, and the message entry is associated with the second user, so that the message state information of the session message may be intuitively provided through the message display content in the message entry of the session list page, duplicative and inefficient operations that the user needs to repeatedly enter and exit the session for checking a message state in order to obtain the communication progress of the session are avoided, and the processing efficiency of the session message is improved.

In an embodiment, on the basis of the above technical schemes, the first content generation module 402 includes a first content generation unit, and the first content generation unit is configured to generate the message display content in the message entry of the session list page of the first user before the second user reads the first session message, where the message display content includes an unread identifier and the first session message.

In an embodiment, on the basis of the above technical schemes, the first content generation module 402 includes a first content updating unit, and the first content updating unit is configured to update the message display content and update the unread identifier into a read identifier after the second user reads the first session message.

In an embodiment, on the basis of the above technical schemes, the first content generation module 402 includes a second content updating unit, and the second content updating unit is configured to update the message display content and replace the read identifier with an emoji icon replied by the second user when an emoji response of the second user to the first session message is received.

In an embodiment, on the basis of the above technical schemes, the second content updating unit may further include an identifier addition sub-unit, and the identifier addition sub-unit is configured to add a separation identifier between the emoji icon and the first session message.

In an embodiment, on the basis of the above technical schemes, the first content updating unit may include an identifier changing sub-unit, and the identifier changing sub-unit is configured to change the color and/or brightness of the unread identifier to generate the read identifier.

In an embodiment, on the basis of the above technical schemes, the session message display apparatus may further include a message receiving module and a second content generation module. The message receiving module is configured to receive a second session message input by the one or more second users for the first user. The second content generation module is configured to generate a message display content in a message entry of a session list page of the first user according to a reading action of the first user on the second session message. The message display content includes the second session message and message state information of the second session message, and the message entry is associated with the one or more second users.

The session message display apparatus provided in the embodiments of the present disclosure may execute the session message display method provided in the embodiments of the present disclosure, and has function modules and effects corresponding to the execution method.

Figure 5:
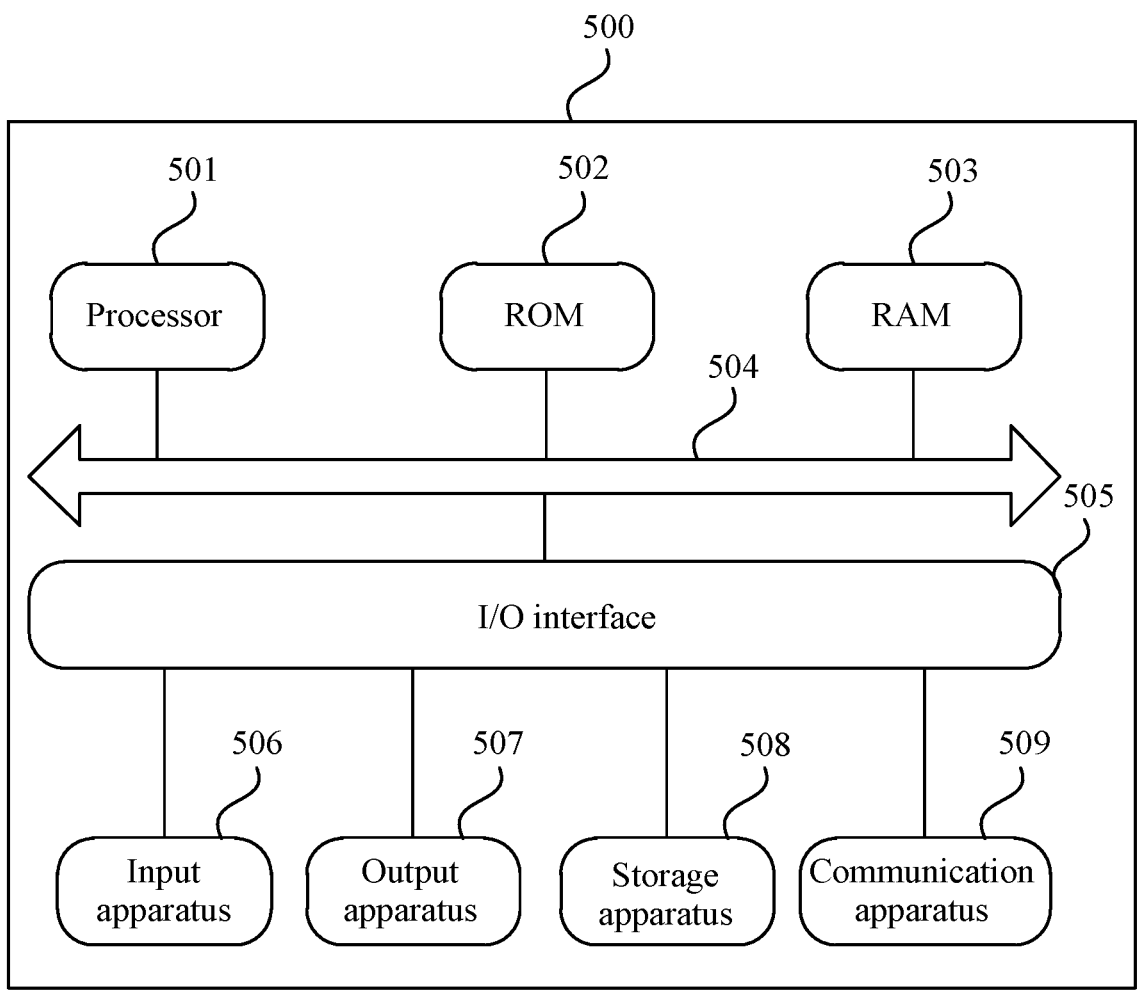
FIG. 5 is a schematic structural diagram of an electronic device provided in an embodiment of the present disclosure.

Referring to FIG. 5, FIG. 5 shows a schematic structural diagram of an electronic device 500 suitable for use in implementing embodiments of the present disclosure. The electronic device in the embodiments of the present disclosure may include, but is not limited to, such as a mobile phone, a notebook computer, a digital broadcast receiver, a personal digital assistant (PDA), a portable android device (PAD), a portable media player (PMP), an in-vehicle terminal (such as an in-vehicle navigation terminal). The electronic device shown in FIG. 5 is merely one example and should not place any limitation on the functionality and the usage scope of the embodiments of the present disclosure.

As shown in FIG. 5, the electronic device 500 may include a processor (such as a central processor, a graphics processor) 501, the processor 501 may perform multiple appropriate actions and processes according to a program stored in a read-only memory (ROM) 502 or a program loaded into a random access memory (RAM) 503 from a storage apparatus 508. In the RAM 503, multiple programs and data required for the operation of the electronic device 500 are also stored. The processor 501, the ROM 502, and the RAM 503 are connected via a bus 504. An input/output (I/O) interface 505 is also connected to the bus 504.

In general, the following apparatuses may be connected to the I/O interface 505: an input apparatus 506 including, such as a touchscreen, a touchpad, a keyboard, a mouse, a camera, a microphone, an accelerometer, a gyroscope; an output apparatus 507 including, such as a liquid crystal display (LCD), a speaker, a vibrator; a storage apparatus 508 including, such as a tape, a hard disk; and a communication apparatus 509. The communication apparatus 509 may allow the electronic device 500 to communicate wirelessly or wired with other apparatuses to exchange data. Although FIG. 5 shows an electronic device 500 with a variety of apparatuses, not all shown apparatuses need to be implemented or provided. More or fewer apparatuses may alternatively be implemented or provided.

According to the embodiments of the present disclosure, a process described above with reference to the flowcharts may be implemented as a computer software program. For example, the embodiments of the present disclosure include a computer program product including a computer program carried on a non-transitory computer-readable medium, the computer program contains a program code for performing the methods shown in the flowcharts. In such embodiments, the computer program may be downloaded and installed from a network through the communication apparatus 509, or installed from the storage apparatus 508, or installed from the ROM 502. When this computer program is executed by the processor 501, the above-described functions defined in the methods of the embodiments of the present disclosure are executed.

The above-described computer-readable medium of the present disclosure may be a computer-readable signal medium, or a computer-readable storage medium, or any combination of the computer-readable signal medium and the computer-readable storage medium. The computer-readable storage medium may be, for example, but is not limited to, an electronic, magnetic, optical, electromagnetic, infrared, or semiconductor system, apparatus, or device, or any combination thereof. The computer-readable storage medium may include, but is not limited to, a portable computer magnetic disk in an electrical connection with one or more wires, a hard disk, a RAM, a ROM, an erasable programmable read-only memory (EPROM or a flash), an optical fiber, a compact disc read-only memory (CD-ROM), an optical storage device, a magnetic storage device, or any suitable combination thereof. In the present disclosure, the computer-readable storage medium may be any tangible medium that contains or stores a program, which may be used by or in combination with an instruction execution system, apparatus, or device. In the present disclosure, the computer-readable signal medium may include a data signal that is contained in a baseband or propagated as a part of a carrier wave, and the data signal carries a computer-readable program code. Such a propagated data signal may take many forms, including but not limited to an electromagnetic signal, an optical signal, or any suitable combination thereof. The computer-readable signal medium may also be any computer-readable medium other than the computer-readable storage medium, and the computer-readable signal medium may send, propagate, or transmit a program for being used by or in combination with the instruction execution system, apparatus, or device. The program code contained in the computer-readable medium may be transmitted by using any appropriate medium, including but not limited to an electric wire, an optical cable, a radio frequency (RF), etc., or any suitable combination thereof.

In some implementations, the client and the server may communicate by utilizing any known or future developed network protocol, such as hypertext transfer protocol (HTTP), and may be interconnected with any form or medium of digital data communication (such as a communication network). Examples of communication networks include a local area network (LAN), a wide area network (WAN), an inter-network (such as the Internet), and a peer-to-peer network (such as ad hoc peer-to-peer network), as well as any known or future developed network.

The above-described computer-readable medium may be included in the above-described electronic device, and it may also be separate and not fitted into the electronic device.

The computer-readable medium carries one or more programs, when the one or more programs are executed by the electronic device, the electronic device is enabled to: receive a first session message input by a first user for one or more second users on a session page, and send the first session message to the one or more second users; generate a message display content in a message entry of the session list page of the first user according to a reading action and/or a reply action of the one or more second users on the first session message, where the message display content includes the first session message and message state information of the first session message, and the message entry is associated with the one or more second users.

A computer program code for performing the operations of the present disclosure may be written in one or more programming languages or combinations thereof, the above-described programming languages include, but are not limited to, an object-oriented programming language—such as Java, Smalltalk, C++, and further include a conventional procedural programming language—such as a "C" language or similar programming language. The program code may be executed in the following manners: executed entirely on a user's computer, executed partly on the user's computer, executed as an independent software package, executed partly on the user's computer and partly on a remote computer, or executed entirely on the remote computer or a server. In a case where the remote computer is involved, the remote computer may be connected to the user's computer through any kind of network, including a local area network (LAN) or a wide area network (WAN), or may be connected to an external computer (for example, connected to the external computer through an internet provided by an internet service provider).

The flowchart and block diagram in the drawings illustrate the architecture, functionality, and operation of possible implementations of the method, the apparatus, the electronic device and the computer program product according to various embodiments of the present disclosure. In this regard, each block in the flowchart or block diagram may represent a module, a program segment, or a part of codes, which includes one or more executable instructions for implementing a specified logical function. In some alternative implementations, the functions noted in the blocks may occur out of the order noted in the drawings. For example, two blocks shown in succession may, in fact, be executed substantially concurrently, or the two blocks may sometimes be executed in a reverse order, which depends upon the involved functionality. It should also be noted that each block of the block diagram and/or the flowchart, and combinations of blocks of the block diagram and/or the flowchart, may be implemented by a dedicated hardware-based system that performs a specified function or operation, or by a combination of a dedicated hardware and a computer instruction.

The module, the unit, and the sub-unit described in the embodiments of the present disclosure may be implemented in a software manner or in a hardware manner. Names of the modules, the units, and the sub-units do not constitute the limitation of the module or unit itself in one case, for example, the message receiving module may also be described as "a module that receives the second session message input by the one or more second users for the first user", the first content updating unit may also be described as "a unit that after the second user reads the first session message, the message display content is updated, and the unread identifier is updated into the read identifier", and the identifier changing sub-unit may also be described as "a sub-unit that the color and/or the brightness of the unread identifier is changed to generate the read identifier".

The functionality described above herein may be performed, at least in part, by one or more hardware logic components. For example, without limitation, exemplary types of hardware logic components that may be used include a field programmable gate array (FPGA), an application specific integrated circuit (ASIC), an application specific standard part (ASSP), a system-on-a-chip (SOC), a complex programmable logic device (CPLD), etc.

In the context of the present disclosure, a machine readable medium may be a tangible medium that may contain or store programs for use by an instruction execution system, an apparatus, a device, or a combination thereof. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. Examples of the machine-readable storage medium include a portable computer diskette in an electrical connection with one or more wires, a hard disk, a RAM, a ROM, an EPROM, a flash memory, an optical fiber, a CD-ROM, an optical storage device, a magnetic storage device, or any suitable combination of the foregoing.

Moreover, while operations are depicted in a particular order, this should not be understood as requiring that such operations be performed in a particular order shown or in a sequential order. In certain circumstances, multitasking and parallel processing may be advantageous. Likewise, while numerous implementation details are contained in the above discussion, these should not be construed as limitations on the scope of the present disclosure. Some features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it should be understood that the subject matter defined herein is not necessarily limited to the specific features or actions described above. Rather, the specific features and actions described above are merely exemplary forms of implementing the present disclosure.

What is claimed is:

1. A session message display method, being applied to an instant messaging application client and comprising:
    receiving a first session message input by a first user for a second user on a session page, and sending the first session message to an instant messaging application client of the second user;
    in response to a first message being read by the second user, displaying a read identifier in a message entry of a session list page of the first user, wherein the message entry is associated with the second user;
    in response to receiving an emoji icon which is sent from the instant messaging application client of the second user, updating, in the message entry of the session list page of the first user, a message display content by replacing the read identifier with the emoji icon and adding a separation identifier between the emoji icon and the first session message; and
    displaying the updated message display content through the instant messaging application client of the first user for the first user to view the replied emoji icon directly from the session list page.

2. The session message display method of claim 1, further comprising:
    before the first session message is read by the second user, generating, in the message entry of the session list page of the first user, the message display content comprising an unread identifier and the first session message.

3. The session message display method of claim 2, wherein displaying the read identifier in the message entry of the session list page of the first user comprises:
    replacing the unread identifier with the read identifier by changing at least one of a color or a brightness of the unread identifier to generate the read identifier.

4. The session message display method of claim 1, wherein before receiving the first session message input by the first user for the second user, the method further comprises:
    receiving a second session message input by the second user for the first user;

generating the message display content in the message entry of the session list page of the first user according to a reading action of the first user on the second session message; and displaying the generated message display content on the session list page of the first user;

wherein the message display content comprises the second session message and message state information of the second session message, and the message entry is associated with the second user.

5. An electronic device having an instant messaging application client, comprising:
at least one processor; and
a storage apparatus, which is configured to store at least one program;
wherein the at least one program, when executed by the at least one processor, causes the at least one processor to implement the following:
receiving a first session message input by a first user for a second user on a session page, and sending the first session message to an instant messaging application client of the second user;
in response to a first message being read by the second user, displaying a read identifier in a message entry of a session list page of the first user, wherein the message entry is associated with the second user;
in response to receiving an emoji icon which is sent from the instant messaging application client of the second user, updating, in the message entry of the session list page of the first user, a message display content by replacing the read identifier with the emoji icon and adding a separation identifier between the emoji icon and the first session message; and
displaying the updated message display content through the instant messaging application client of the first user for the first user to view the replied emoji icon directly from the session list page.

6. The electronic device of claim 5, wherein the at least one processor is caused to further implement:
before the first session message is read by the second user, generating, in the message entry of the session list page of the first user, the message display content comprising an unread identifier and the first session message.

7. The electronic device of claim 6, wherein the at least one processor is caused to implement displaying the read identifier in the message entry of the session list page of the first user comprises:
replacing the unread identifier with the read identifier by changing at least one of a color or a brightness of the unread identifier to generate the read identifier.

8. The electronic device of claim 5, wherein before receiving the first session message input by the first user for the second user, the at least one processor is caused to further implement:
receiving a second session message input by the second user for the first user;
generating the message display content in the message entry of the session list page of the first user according to a reading action of the first user on the second session message; and displaying the generated message display content on the session list page of the first user;

wherein the message display content comprises the second session message and message state information of the second session message, and the message entry is associated with the second user.

9. A non-transitory computer-readable storage medium, storing a computer program, wherein the computer program, when executed by a processor, implements the following:
receiving a first session message input by a first user for a second user on a session page, and sending the first session message to an instant messaging application client of the second user;
in response to a first message being read by the second user, displaying a read identifier in a message entry of a session list page of the first user, wherein the message entry is associated with the second user;
in response to receiving an emoji icon which is sent from the instant messaging application client of the second user, updating, in the message entry of the session list page of the first user, a message display content by replacing the read identifier with the emoji icon and adding a separation identifier between the emoji icon and the first session message; and
displaying the updated message display content through the instant messaging application client of the first user for the first user to view the replied emoji icon directly from the session list page.

10. The non-transitory computer-readable storage medium of claim 9, wherein the computer program further implements:
before the first session message is read by the second user, generating, in the message entry of the session list page of the first user, the message display content comprising an unread identifier and the first session message.

11. The non-transitory computer-readable storage medium of claim 10, wherein the computer program implements displaying the read identifier in the message entry of the session list page of the first user comprises:
replacing the unread identifier with the read identifier by changing at least one of a color or a brightness of the unread identifier to generate the read identifier.

12. The non-transitory computer-readable storage medium of claim 9, wherein before receiving the first session message input by the first user for the second user, the computer program further implements:
receiving a second session message input by the second user for the first user;
generating the message display content in the message entry of the session list page of the first user according to a reading action of the first user on the second session message; and
displaying the generated message display content on the session list page of the first user;
wherein the message display content comprises the second session message and message state information of the second session message, and the message entry is associated with the second user.

* * * * *